Jan. 13, 1931.  F. R. KANDLE  1,788,875
FOOD CHOPPER
Filed May 14, 1929
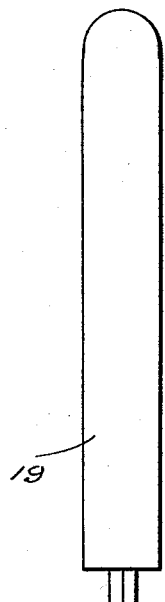
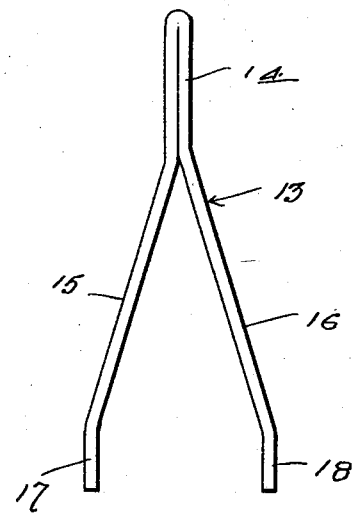
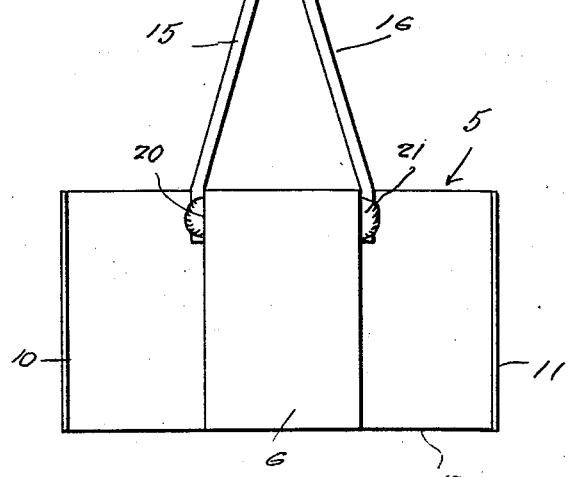
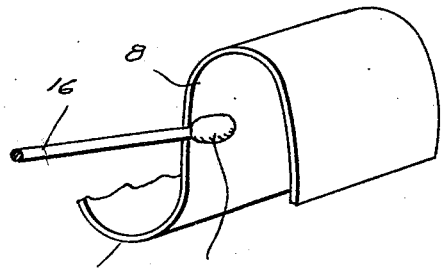
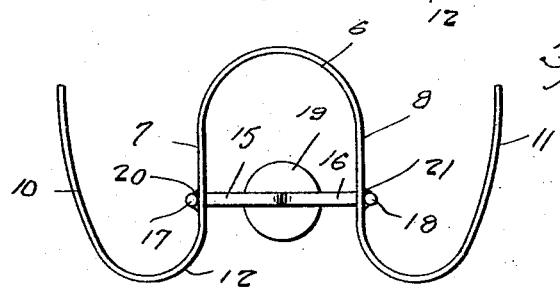
Inventor
Frank R. Kandle
By Clarence A. O'Brien
Attorney Patented Jan. 13, 1931

1,788,875

UNITED STATES PATENT OFFICE

FRANK R. KANDLE, OF YAKIMA, WASHINGTON

FOOD CHOPPER

Application filed May 14, 1929. Serial No. 362,971.

This invention relates to food choppers and an object thereof is to provide for cutting food in irregular portions and furthermore to provide for a device that has no irregular or crimped surfaces that might be hard to clean.

An object of the invention is to provide in a manner as hereinafter set forth a food chopper of the character referred to which is very simple in its method of assembly, strong, compact and durable, thoroughly reliable in its intended purpose, utilizing the handle to reinforce the body portion of the chopper and extremely simple and inexpensive to manufacture.

With the foregoing and other objects in view, the invention consists in the novel construction, combination and arrangement of parts, as will be hereinafter more specifically described and illustrated in the accompanying drawings, wherein is disclosed an embodiment of the invention, but it is to be understood that changes, variations and modifications may be resorted to, without departing from the spirit of the claims hereunto appended.

In the drawings, wherein like reference characters denote corresponding parts throughout the several views:

Figure 1 is a side elevation of the device in accordance with the invention.

Figure 2 is an outer end view thereof.

Figure 3 is a fragmentary perspective view of a portion of the chopper body illustrating the method of attaching the handle thereto.

Figure 4 is a side elevation of the handle member illustrating the formation thereof in accordance with this invention.

Referring to the drawings in detail, 5 indicates the corrugated body portion of the food chopper having the corrugations vertically extending and is more particularly formed with an inverted U-shaped intermediate section 6 having the legs 7, 8, merging with U-shaped opposite ends 10, 11, the lower edge of the body portion indicated at 12 may be sharpened for cutting purposes.

The handle portion is indicated generally at 13 and consists of a rod folded upon itself at one end as indicated at 14. Intermediate the ends, the rod is bifurcated as at 16, and the bifurcations merge into parallel extensions 17, 18, on the ends thereof. A wooden sleeve 19 is formed with an axially extending socket, not shown in the drawings, on the inner end, on which is seated the folded portion 14 of the handle 13, whereby a gripping member is provided for the handle. A sleeve 19 is of materially greater diameter than the rod of which the handle is formed and provides a more comfortable grip for the hands of the user as a food chopper.

The parallel extensions 17, 18 on the end of the bifurcations 15, 16, are welded or soldered to the upper edges of the legs 7, 8, whereby the handle is not only attached to the food chopper body portion but the bifurcations 15, 16, provide for reinforcing the intermediate inverted U-shaped portion to prevent bending or getting out of alignment.

In the fabrication of the device, the body portion 5 may be formed of a single piece of plate of very light gauge, whereby the corrugations may be made by a press. Since the handle 13 is formed of a single rod, the cost of manufacture is materially reduced and moreover the method of assembling the device is greatly simplified.

It is thought that the construction, operation and advantages of the invention may now be understood without a more detailed description thereof. The present embodiment of the invention has been disclosed in detail merely by way of exemplification, since in actual practice they attain the features of advantage enumerated as desirable in the statement of the invention and the above description.

Having described my invention, what I claim is:

1. A food chopper comprising a body portion formed of a central inverted U-shaped fold intermediate and merging at the end of its legs with a U-shaped loop formed on the opposite ends of said legs, a handle, said handle formed of a single rod folded upon itself at one end and to provide divergent extensions bifurcated at the other ends, said extensions being secured at the upper end of the inverted U-shaped portion, and reinforcing the same to prevent bending and disalinement of the said central U-shaped portion, said U-shaped portion extending vertically and having the lower edges thereof used for a cutting edge, and a wooden sleeve mounted on said folded end of the handle.

2. A food chopper comprising a cutting blade consisting of an elongated and relatively wide flat metallic plate corrugated to provide longitudinally alined and transversely extending convolutions opening alternately on opposite sides of the plate and a handle having diverging rods respectively secured to opposite walls of a medial convolution and adjacent an edge of the plate, said rods reinforcing the plate in a manner to hold the convolutions in alinement.

In testimony whereof I affix my signature.

FRANK R. KANDLE.